(12) United States Patent
Popovski et al.

(10) Patent No.: US 7,586,846 B2
(45) Date of Patent: Sep. 8, 2009

(54) SYSTEM AND METHOD FOR RELAYING SIGNAL IN A COMMUNICATION SYSTEM

(75) Inventors: Petar Popovski, Aalborg (DK);
Hiroyuki Yomo, Aalborg (DK);
Elisabeth De Carvalho, Aalborg (DK);
Kathiravetpillai Sivanesan, Suwon-si (KR); Do-Young Kim, Yongin-si (KR);
Dong-Seek Park, Yongin-si (KR);
Sung-Kwon Hong, Seoul (KR)

(73) Assignee: Samsung Electronics Co., Ltd (KR)

( * ) Notice: Subject to any disclaimer, the term of this patent is extended or adjusted under 35 U.S.C. 154(b) by 650 days.

(21) Appl. No.: 11/388,682

(22) Filed: Mar. 24, 2006

(65) Prior Publication Data

US 2007/0223374 A1    Sep. 27, 2007

(51) Int. Cl.
*H04L 12/26* (2006.01)
(52) U.S. Cl. .................................. 370/232; 370/203

(58) Field of Classification Search ............... 370/230, 370/465, 235, 203, 204, 252, 232
See application file for complete search history.

(56) References Cited

U.S. PATENT DOCUMENTS

| 2005/0014464 A1* | 1/2005 | Larsson ............. 455/11.1 |
| 2006/0159085 A1* | 7/2006 | Lee et al. ............. 370/389 |
| 2007/0160014 A1* | 7/2007 | Larsson ............. 370/338 |
| 2007/0165581 A1* | 7/2007 | Mehta et al. ............. 370/338 |

* cited by examiner

*Primary Examiner*—Brian D Nguyen
(74) *Attorney, Agent, or Firm*—The Farrell Law Firm, LLP

(57) ABSTRACT

A source node of a communication system selects one of a direct mode, a multi-hop mode, and a superposition mode as a transmission mode to be used for signal transmission from the source node to a destination node, taking into account data rates for a link between the source node and the destination node, a link between the source node and a delay node, and a link between the relay node and the destination node, thereby increasing the data rate, i.e., the throughput, of the entire communication system.

18 Claims, 4 Drawing Sheets

SYSTEM AND METHOD FOR RELAYING SIGNAL IN A COMMUNICATION SYSTEM

BACKGROUND OF THE INVENTION

1. Field of the Invention

The present invention relates generally to a communication system, and in particular, to a signal relay system and method for increasing throughput in a communication system.

2. Description of the Related Art

FIG. 1 is a diagram illustrating a configuration of a signal relay system in a general communication system.

Referring to FIG. 1, the signal relay system includes a source node S, a destination node D, and a relay node R. The source node S transmits a signal to the destination node D, and the relay node R performs a relay operation for signal transmission from the source node S to the destination node D.

The signal transmitted by the source node S may be received at both the relay node R and the destination node D due to the characteristics of the wireless transmission medium. However, a signal-to-Noise Ratio (SNR) $\gamma_{SR}$ between the source node S and the relay node R can be higher than an SNR $\gamma_{SD}$ between the source node S and the destination node D, and this indicates that the signal transmission from the source node S to the relay node R is superior to the signal transmission from the source node S to the destination node D in terms of the throughput. In particular, there is a possible case where the signal transmitted by the source node S is safely received at the relay node R, but is never received at the destination node D. In this case, the signal transmission from the source node S to the relay node R is surely superior to the signal transmission from the source node S to the destination node D in terms of the throughput, because the signal transmission from the source node S to the destination node D is completely impossible.

Generally, in a multi-hop mode, the signal transmitted by the source node S is safely received at the relay node R, but is never received at the destination node D. In the multi-hop mode, the relay node R must relay all signals received from the source node S to the destination node D. In order to increase throughput of the communication system in this way, it is important to efficiently perform signal transmission between the source node S and the relay node R and increase throughput between the source node S and the destination node D. Accordingly, there is a need for a signal relay scheme for increasing the throughput of the communication system.

SUMMARY OF THE INVENTION

It is, therefore, an object of the present invention to provide a signal relay system and method for increasing throughput in a communication system.

According to one aspect of the present invention, there is provided a system for relaying a signal in a communication system, comprising a source node; a destination node; and a relay node. The source node comprises calculating a data rate of an Adaptive Modulation and Coding (AMC) mode, which should be used to maximize a data rate on each of a first link between the source node and the destination node, a second link between the source node and the relay node, and a third link between the relay node and the destination node; calculating a first data rate for the case where a multi-hop mode is used for signal transmission between the source node and the destination node; calculating a first optimal data rate for the case where transmission modes available for signal transmission between the source node and the destination node include a direct mode and the multi-hop mode; selecting an AMC mode to be used for the first link and determining a second data rate for the first link when the selected AMC mode is used; calculating an available signal-to-noise ratio (SNR) needed to decode a superposed message after a basic message is decoded, when a signal transmitted from the source node to the destination node includes the basic message and the superposed message; determining a third data rate at which the superposed message is transmitted with reliability; calculating a second optimal data rate for the case where a transmission mode available for signal transmission between the source node and the destination node is the superposition mode; determining whether the second optimal data rate exceeds the first optimal data rate; and determining to use the superposition mode for signal transmission from the source node to the destination node, if the second optimal data rate exceeds the first optimal data rate.

According to another aspect of the present invention, there is provided a method for relaying a signal in a source node of a communication system. The method comprises the steps of: calculating a data rate of an Adaptive Modulation and Coding (AMC) mode, which should be used to maximize a data rate on each of a first link between the source node and a destination node, a second link between the source node and a relay node, and a third link between the relay node and the destination node; calculating a first data rate for the case where a multi-hop mode is used for signal transmission between the source node and the destination node; calculating a first optimal data rate for the case where transmission modes available for signal transmission between the source node and the destination node include a direct mode and the multi-hop mode; selecting an AMC mode to be used for the first link and determining a second data rate for the first link when the selected AMC mode is used; calculating an available signal-to-noise ratio (SNR) needed to decode a superposed message after a basic message is decoded, when a signal transmitted from the source node to the destination node includes the basic message and the superposed message; determining a third data rate at which the superposed message is transmitted with reliability; calculating a second optimal data rate for the case where a transmission mode available for signal transmission between the source node and the destination node is the superposition mode; determining whether the second optimal data rate exceeds the first optimal data rate; and determining to use the superposition mode for signal transmission from the source node to the destination node, if the second optimal data rate exceeds the first optimal data rate.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF EXEMPLARY EMBODIMENTS

Exemplary embodiments of the present invention will now be described in detail with reference to the annexed drawings. In the following description, a detailed description of known functions and configurations incorporated herein will be omitted for clarity and conciseness.

The present invention proposes a signal relay system and method for increasing throughput in a communication system. Although not separately illustrated in the following description, the signal relay scheme proposed in the present invention can be applied to the configuration of the communication system described with reference to FIG. 1.

Before a description of the present invention is given, a description will now be made of a superposition coding scheme and an Adaptive Modulation and Coding (AMC) scheme.

(1) Superposition Coding Scheme

The superposition coding scheme, which is a kind of an Unequal Error Protection (UEP) scheme, has recently attracted much attention in relation to the wireless systems. The UEP scheme differently protects different signals, for example, different data bits, using a modulation/coding scheme. The typical case for transmitting a signal using the UEP scheme includes the case where a transmission signal can be expressed with a basic message and a superposed message, like the case where the transmission signal includes basic multimedia contents and multimedia information including detailed information on the basic multimedia contents. The superposed message is more tolerable than the basic message in terms of the loss rate.

For example, assume that there is a packet including 10 bits of b1, b2, . . . , b10, and of the 10 bits, 5 bits of b1, b2, . . . , b5 should be better protected than the other 5 bits of b6, b7, . . . , b10. To transmit the bits b1, b2, . . . , b10, 5 non-uniform Quadrature Phase Shift Keying (QPSK) modulation symbols should be used, and a description thereof will be made with reference FIG. 2.

Figure 2:
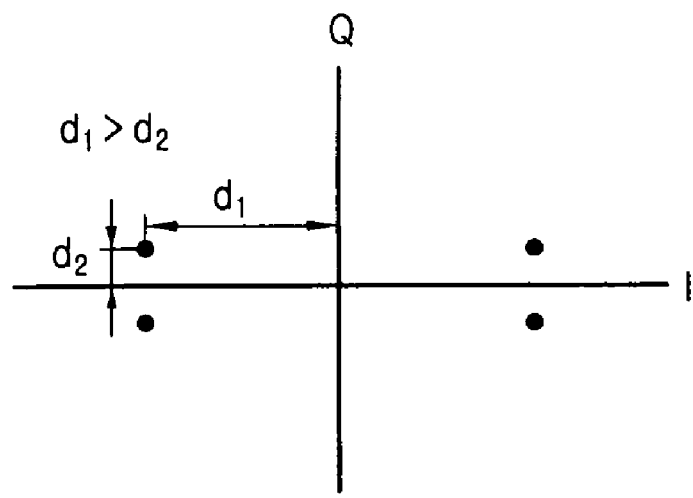
FIG. 2 is a diagram illustrating a symbol constellation for general asymmetric QPSK (Binary Phase Shift Keying (BPSK) superposed to BPSK)

FIG. 2 is a diagram illustrating a symbol constellation for general asymmetric QPSK (Binary Phase Shift Keying (BPSK) superposed to BPSK).

Referring to FIG. 2, to generate a first modulation symbol, the bit b1 is mapped to the I component and the bit b6 is mapped to the Q component. In this manner, the other 4 modulation symbols of second through fifth modulation symbols are generated. It will be assumed that the packet is divided into two sub-packets, and of the two sub-packets, a first sub-packet is denoted by $b_1=(b_1, b_2, \ldots b_5)$ and a second sub-packet is denoted by $b_2=(b_6, b_7, \ldots b_{10})$.

In this case, in a poor channel state, i.e., in a low-SNR channel state, the first sub-packet $b_1=(b_1, b_2, \ldots b_5)$ will be received with higher reliability than the second sub-packet $b_2=(b_6, b_7, \ldots b_{10})$. On the contrary, in an excellent channel state, i.e., a high-SNR channel state, there is a high probability that the second sub-packet $b_2=(b_6, b_7, \ldots b_{10})$ as well as the first sub-packet $b_1=(b_1, b_2, \ldots b_5)$ will be received with high reliability. Therefore, the present invention proposes a scheme for relaying signals based on the superposition coding scheme.

The superposition coding scheme for the case where a BPSK-modulated signal is superposed to a stronger BPSK-modulated signal has been described so far with reference to FIG. 2. Next, with reference to FIG. 3, a description will be made of the superposition coding scheme for the case where 8-ary Phase Shift Keying (8 PSK) is superposed to QPSK.

Figure 3:
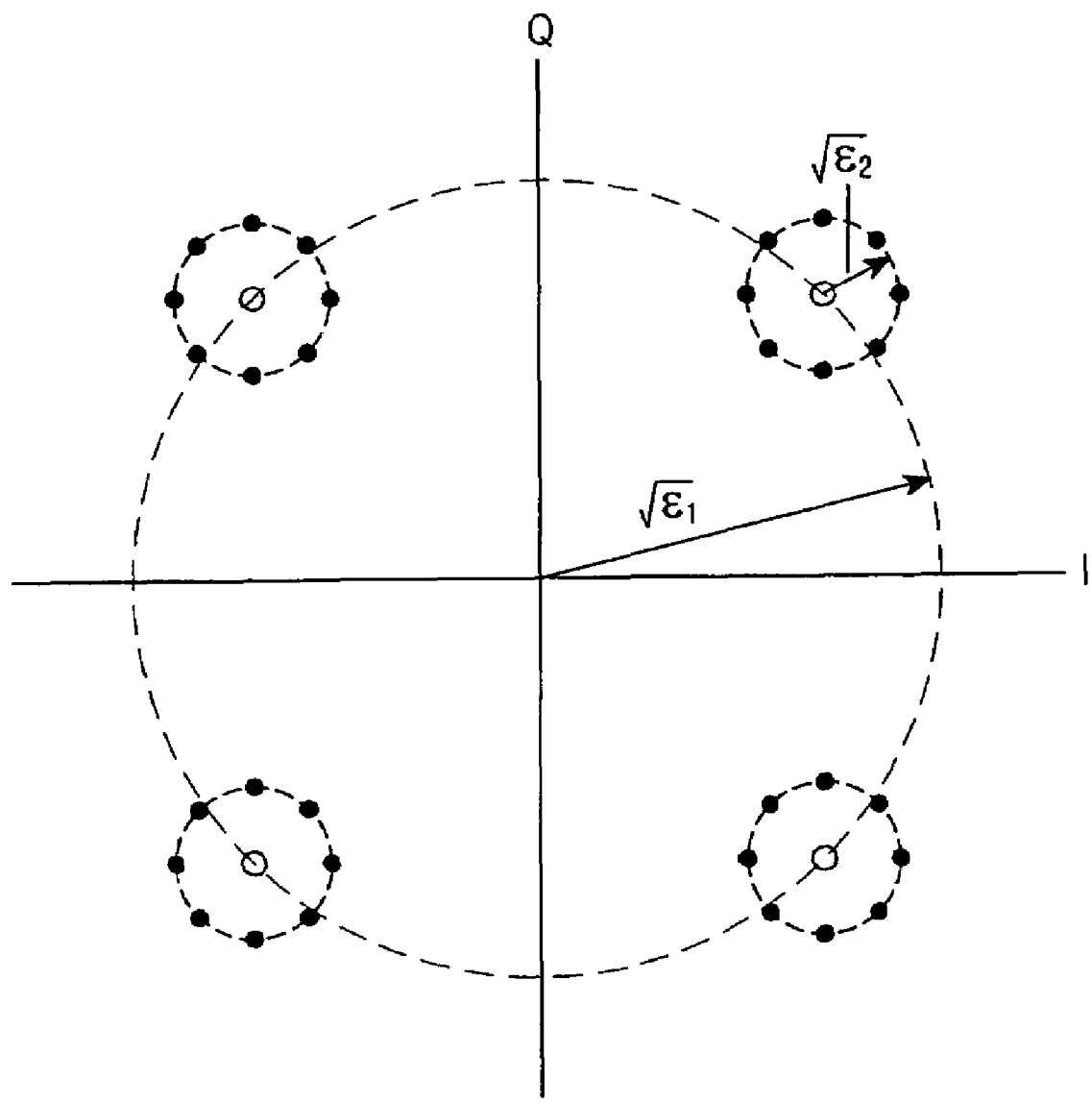
FIG. 3 is a diagram illustrating an example where an 8 PSK constellation is superposed to a QPSK constellation to acquire a non-uniform 32 QAM constellation.

FIG. 3 is a diagram illustrating an example where an 8 PSK constellation is superposed to a QPSK constellation to acquire a non-uniform 32-ary Quadrature Amplitude Modulation (32 QAM) constellation.

Referring to FIG. 3, it can be noted that the 3 bits that determine an 8 PSK component of the modulation symbol are less protected than the 2 bits that determine a QPSK component. Assuming that h denotes a channel gain between a transmitter and a receiver of the communication system, a signal r received at the receiver can be represented by $$r = h(\sqrt{E_1}x_1 + \sqrt{E_2}x_2) + z \qquad (1)$$

In Equation (1), $x_1$ and $x_2$ are complex numbers with $|x_1|=|x_2|=1$, defined such that $x_1$ and $x_2$ determine the transmitted phases of the QPSK and 8 PSK components, respectively. A complex noise component is denoted by z and has a variance $\sigma^2$.

Therefore, the QPSK component will be referred to as a "basic component" of a superposition code, while the 8 PSK component will be referred to as a "superposed component" of the superposition code. In addition, a message carried by the QPSK component will be referred to as a "basic message," while a message carried by the 8 PSK component will be referred to as a "superposed message." As a result, the total energy $E_{total}$ present in a transmitted symbol is $E_{total}=E_1+E_2$, and an SNR at the destination, i.e., at the receiver, is given by $$\gamma = \frac{|h|^2(E_1 + E_2)}{\sigma^2} \qquad (2)$$

It is assumed that each component of the superposed signal carries an independent message. This indicates that if N modulation symbols in the constellation of FIG. 3 are sent, then the basic message contains 2 N bits, while the additional message, i.e., the superposed message, contains 3 N bits. A description will now be made of a scheme for decoding the coded signal using the superposition coding scheme.

First, the basic message can be detected by considering that the component $h\sqrt{E_2}x_2$ in the received signal r shown in Equation (1) is noise. In this case, the basic message becomes $h\sqrt{E_2}x_2+z$. Therefore, an 8 SPK signal is demodulated taking only the basic message $h\sqrt{E_2}x_2+z$ into account. Next, amplitude of the superposed message can affect reception reliability of the basic message. That is, the error probability for the received QPSK signal depends on the actual value of the 8 PSK signal. In the worst case, assuming that an unfavorable 8 PSK signal is being transmitted, the unfavorable 8 PSK signal used for deciding the received QPSK signal is denoted by $$r_1 = h(\sqrt{E_1} - \sqrt{E_2})x_1 + z \qquad (3)$$

In addition, a Bit Error Probability (BEP) for the basic message is upper-bounded by the BEP for transmission of a non-superposed QPSK signal with effective energy $E_{eff}=(\sqrt{E_1}-\sqrt{E_2})^2$. That is, the SNR $\gamma_b$ used for detection of the basic message is approximated by $$\gamma_b = \frac{|h|^2(\sqrt{E_1} - \sqrt{E_2})^2}{\sigma^2} \qquad (4)$$

Provided that the basic message has been decoded correctly, the SNR $\gamma_s$ used for decoding the superposed message is $$\gamma_s = \frac{|h|^2 E_2}{\sigma^2} \quad (5)$$

(2) Adaptive Modulation and Coding (AMC) Scheme

With the use of the AMC scheme, the link adapts to the actual transmitting conditions and attempts to maximize the attained spectral efficiency. Assuming that there are M AMC modes used in the communication system, an $M^{th}$ AMC mode has a data rate $R_m$, where $R_1 < R_2 < \ldots < R_M$. Herein, the AMC scheme includes a plurality of Modulation and Coding Scheme (MCS) levels, and if the number of the MCS levels is M, there are M AMC modes.

In addition, assume that $PER_m(\gamma)$ denote a Packet Error Rate (PER) when the transmitter uses an $m^{th}$ AMC mode and the SNR at the receiver is equal to $\gamma$. In this case, for given $\gamma$, $PER_1(\gamma) < PER_2(\gamma) < \ldots < PER_M(\gamma)$. When the transmitter uses the $m^{th}$ AMC mode and the SNR in the receiver is $\gamma$, the throughput is given by $$R_m(1 - PER_m(\gamma)) \quad (6)$$

If an AMC mode selected for the SNR $\gamma$ is denoted by m*, the AMC mode m* is selected based on the criterion given by $$m^* = \max_m [R_m(1 - PER_m(\gamma))] \quad (7)$$

The AMC mode m* selected for the SNR $\gamma$ in accordance with Equation (7) is an AMC mode that maximizes the throughput, i.e., the data rate.

In order to have definite PER values, the packet size N should be fixed to 1080 (N=1080). Due to the monotonicity of $PER_m(\gamma)$, SNR thresholds for selecting a given AMC mode can be found by comparing two AMC modes at a certain time. If the lowest SNR threshold is denoted by $\tau_1$, it can be noted that for $\gamma < \tau_1$, even the lowest AMC mode is unusable. Herein, the term "lowest AMC mode" refers to an AMC mode that uses the lowest MCS level. Assume that there are a total of M SNR thresholds $\tau_m$, where $\tau_1 < \tau_2 < \ldots < \tau_M$. In this case, for $\tau_m < \tau_{m+1}$, the $m^{th}$ AMC mode is utilized and the SNR threshold $\tau_{m+1}$ is determined by $$R_{m+1} \cdot (1 - PER_{m+1}(\tau_{m+1})) = R_m \cdot (1 - PER_m(\tau_m)) \quad (8)$$

The mapping determined by the AMC mode selection is defined as $$R = A(\gamma) \quad (9)$$

In Equation (9), R denotes a data rate of an AMC mode that should be applied to maximize the throughput when the SNR over the link is $\gamma$. Table 1 below shows the SNR thresholds when uncoded M-ary QAM modulation is used with a packet size of N=1080 bits.

In Table 1, Mode denotes the AMC mode, Modulation denotes a modulation scheme, Rate denotes a data rate, and Threshold denotes an SNR threshold.

Table 2 below shows the SNR thresholds when coded M-ary QAM modulation is used with a packet size of N=1080 bits.

TABLE 2

| Mode m | 1 | 2 | 3 | 4 | 5 | 6 |
|---|---|---|---|---|---|---|
| Modulation | BPSK | QPSK | 8PSK | 16QAM | 32QAM | 64QAM |
| Coding rate | 1/2 | 1/2 | 3/4 | 9/16 | 3/4 | 3/4 |
| Rate $r_m$ [bps/sym] | 0.5 | 1 | 1.5 | 2.25 | 3 | 4.5 |
| Thresholds $\tau_m$ [dB] | −1.5331 | 1.7169 | 4.9769 | 8.7769 | 11.5469 | 17.1469 |

In Table 2, Coding rate denotes a coding rate.

The superposition coding scheme, realized with the foregoing PSK modulation schemes, can be utilized to achieve rate adaptation with fine granularity.

A description will now be made of the general signal relay method.

Figure 1:
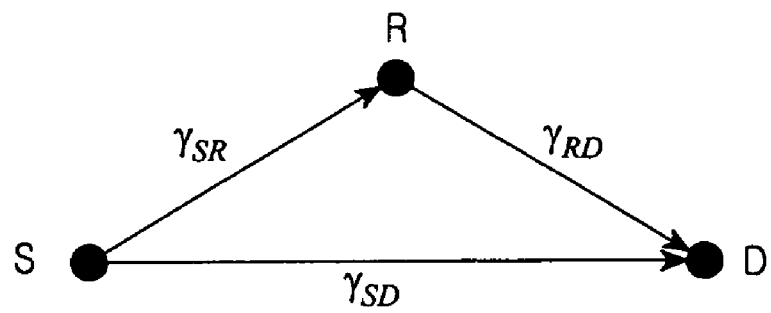
FIG. 1 is a diagram illustrating a configuration of a signal relay system in a general communication system.

It will be assumed that the source node S described with reference to FIG. 1 transmits the signal given as $$\sqrt{E_1} x_1 + \sqrt{E_2} x_2 \quad (10)$$

The signal received at the destination node D is given by $$r_D = h_{SD}(\sqrt{E_1} x_1 + \sqrt{E_2} x_2) + z_D \quad (11)$$

In Equation (11), $r_D$ denotes a signal received at the destination node D, $h_{SD}$ denotes a channel gain between the source node S and the destination node D, and $z_D$ denotes a complex noise signal at the destination node D.

The signal received at the relay node R is given by $$r_R = h_{SR}(\sqrt{E_1} x_1 + \sqrt{E_2} x_2) + z_R \quad (12)$$

In Equation (12), $r_R$ denotes a signal received at the relay node R, $h_{SR}$ denotes a channel gain between the source node S and the relay node R, and $z_R$ denotes a complex noise signal at the relay node R.

Herein, an SNR of the link between the source node S and the destination node D will be defined as $\gamma_{SD}$, an SNR of the link between the source node S and the relay node R will be defined as $\gamma_{SR}$, and an SNR of the link between the relay node R and the destination node D will be defined as $\gamma_{RD}$. A data rate achievable for use of an AMC mode at the link between the source node S and the destination node D will be defined as $R_{SD}$, a data rate achievable for use of an AMC mode at the link between the source node S and the relay node R will be defined as $R_{SR}$, and a data rate achievable for use of an AMC mode at the link between the relay node R and the destination node D will be defined as $R_{RD}$. The $R_{SD}$, $R_{SR}$, and $R_{RD}$ are given by $$R_{SD} = A(\gamma_{SD}) R_{SR} = A(\gamma_{SR}) R_{RD} = A(\gamma_{RD}) \quad (13)$$

A description will now be made of two transmission modes for transmitting signals from the source node S to the destination node D: a direct mode and a multi-hop mode.

TABLE 1

| Mode m | 1 | 2 | 3 | 4 | 5 | 6 | 7 |
|---|---|---|---|---|---|---|---|
| Modulation | BPSK | QPSK | 8PSK | 16QAM | 32QAM | 64QAM | 128QAM |
| Rate $r_m$ [bps/sym] | 1 | 2 | 3 | 4 | 5 | 6 | 7 |
| Thresholds $\tau_m$ [dB] | 6.3281 | 10.0481 | 14.9881 | 17.3881 | 21.6181 | 23.7281 | 27.7881 |

In the direct mode, the relay node R is unused and the data rate is $R_{SD}$. In the multi-hop mode, the signal is transmitted first from the source node S to the relay node R at the data rate $R_{SR}$ and then transmitted from the relay node R to the destination node D at the data rate $R_{RD}$. Herein, the time required to transmit N bits from the source node S to the relay node R at the data rate $R_{SR}$ is $$T = \frac{N}{R_{SR}}.$$

The time required to transmit N bits from the relay node R to the destination node D at the data rate $R_{RD}$ is $$\frac{R_{SR}}{R_{RD}}T.$$

Therefore, the data rate $R_{mh}$ in the multi-hop mode is given by $$R_{mh} = \frac{N}{T + \frac{R_{SR}}{R_{RD}}T} = \frac{R_{SR}R_{RD}}{R_{SR} + R_{RD}} \quad (14)$$

Assume that the source node S is a base station (BS) and the BS is aware of all of the three rates $R_{SD}$, $R_{SR}$, and $R_{RD}$. Then the BS can calculate the $R_{mh}$ and compare it with $R_{SD}$. If $R_{mh} > R_{SD}$, then the BS selects the multi-hop mode to transmit the signal. Otherwise, if $R_{mh} \leq R_{SD}$, the BS selects the direct mode. Hence, the optimal data rate $R_{conv}$ between the source node S and the destination node D is determined by Equation (15). Herein, the optimal data rate $R_{conv}$ represents the optimal data rate for the case where both the direct mode and the multi-hop mode can be used for signal transmission between the source node S and the destination node D.

$$R_{conv} = \max\{R_{SD}, R_{mh}\} \quad (15)$$

The present invention proposes a new transmission mode, i.e., a superposition mode, for transmitting a signal from the source node S to the destination node D. The superposition mode will now be described below.

Assume that $\gamma_{SD}$ denotes an SNR for the case where a $b^{th}$ AMC mode can be applied on the link between the source node S and the destination node D with the data rate $R_{SD} = R_b > 0$. The applicability of the $b^{th}$ AMC mode on the link between the source node S and the destination node D implies that $\gamma_{SD} > \tau_b$. Then, Equation (2) can rewritten as $$\gamma_{SD} = \frac{|h_{SD}|^2(E_1 + E_2)}{\sigma^2} = \frac{|h_{SD}|^2 E_{total}}{\sigma^2} \quad (16)$$

In Equation (16), the total transmission power $E_{total}$ is fixed. In order to transmit the basic message at the data rate $R_b$, Equation (4) should be used. Hence, it is sufficient to have $$\tau_b = \frac{|h_{SD}|^2(\sqrt{E_1} - \sqrt{E_2})^2}{\sigma^2} \quad (17)$$

For the fixed transmission power $E_{total}$ and the channel gain $|h_{SD}|$, the $\gamma_{SD}$ and $\tau_b$ have fixed values and it can be found that $$\frac{|h_{SD}|^2}{\sigma^2}E_1 = \frac{(\sqrt{2\gamma_{SD} - \tau_b} + \sqrt{\tau_b})^2}{4} \quad (18)$$

$$\frac{|h_{SD}|^2}{\sigma^2}E_2 = \frac{(\sqrt{2\gamma_{SD} - \tau_b} + \sqrt{\tau_b})^2}{4}$$

In Equation (18), for shorter notation, it is assumed that both $\gamma_{SD}$ and $\tau_b$ are the real values, not expressed in [dB].

Assume that the destination node D decodes only the basic message and does not even attempt to decode the superposed message. In this case, the received signal at the relay node R shown in Equation (12) will be taken into consideration. The natural assumption for the signal relay systems will be used, shown below.

$$|h_{SR}| > |h_{SD}| \quad (19)$$

With the condition of Equation (19), the available SNR $\gamma_{b,R}$ used for decoding the basic message transmitted from the source node S at the relay node R is given by $$\gamma_{b,R} = \frac{|h_{SR}|^2(\sqrt{E_1} - \sqrt{E_2})^2}{\sigma^2} = \frac{|h_{SR}|^2}{|h_{SD}|^2}\tau_b > \tau_b \quad (20)$$

The basic message is decoded at the relay node R with very high reliability, i.e., the available SNR is unnecessarily high for that AMC mode. Regarding the superposed message, after the basic message is decoded correctly, the available SNR $\gamma_{s,R}$ necessary for decoding the superposed message is $$\gamma_{s,R} = \frac{|h_{SR}|^2 E_2}{\sigma^2} = \frac{|h_{SR}|^2}{|h_{SD}|^2}\frac{(\sqrt{2\gamma_{SD} - \tau_b} - \sqrt{\tau_b})^2}{4} \quad (21)$$

In Equation (21), if $\gamma_{s,R} > \tau_s$, where $s \in \{1, 2, \ldots M\}$, then the superposed message reliably carries information from the source node S to the relay node R at the data rate $R_s = A(\gamma_{s,R})$. Hence, the total data rate carried from the source node S to the relay node R is $R_b + R_s$.

When the superposition mode is used to convey the signal from the source node S to the destination node D, after the signal transmission of the source node S, the relay node R retransmits the superposed message on the link between the relay node R and the destination node D at the data rate $R_{RD}$. Hence, the optimal data rate $R_{sup}$ between the source node S and the destination node D when the superposition mode is used can be calculated as follows. Herein, the term "optimal data rate $R_{sup}$" refers to the optimal data rate for the case where the transmission mode available for signal transmission between the source node S and the destination node D is the superposition mode.

Assume that during time T, the source node S transmits $N_b$ bits of the basic message and $N_s$ bits of the superposed message, such that $$R_b = \frac{N_b}{T}$$

and $$R_s = \frac{N_s}{T}.$$

The time required to retransmit $N_s$ bits from the relay node R to the destination node D at the data rate $R_{RD}$ is $$\frac{N_s}{R_{RD}},$$

so the optimal data rate $R_{sup}$ can be written as $$R_{sup} = \frac{N_b + N_s}{T + \frac{N_s}{R_{RD}}} = \frac{R_{RD}(R_b + R_s)}{R_{RD} + R_s} \quad (22)$$

As a result, the source node S, i.e., the base station (BS), selects the transmission mode to maximize the throughput, i.e., to maximize the data rate, on the links between the source node S and the destination node D, between the source node S and the relay node R, and between the relay node R and the destination node D, for a given SNR. Hence, the optimal data rate $R_{proposed}$ between the source node S and the destination node D is given by Equation (23) below. Herein, the term "optimal data rate $R_{proposed}$" refers to the optimal data rate for the case where the transmission mode available for signal transmission between the source node S and the destination node D is the direct mode, the multi-hop mode and the superposition mode.

$$R_{proposed} = \max\{R_{SD}, R_{mh}, R_{sup}\} \quad (23)$$

If the total energy $E_{total}$ is fixed and the superposition mode is used, then the energy of the basic message and the superposed message is determined by $$\frac{|h_{SD}|^2}{\sigma^2} = \frac{\gamma_{SD}}{E_{total}} \quad (24)$$

$$E_1 = \frac{E_{total}}{\gamma_{SD}} \frac{\left(\sqrt{2\gamma_{SD} - \tau_b} + \sqrt{\tau_b}\right)^2}{4}$$

$$E_2 = \frac{E_{total}}{\gamma_{SD}} \frac{\left(\sqrt{2\gamma_{SD} - \tau_b} - \sqrt{\tau_b}\right)^2}{4}$$

Figure 4A:
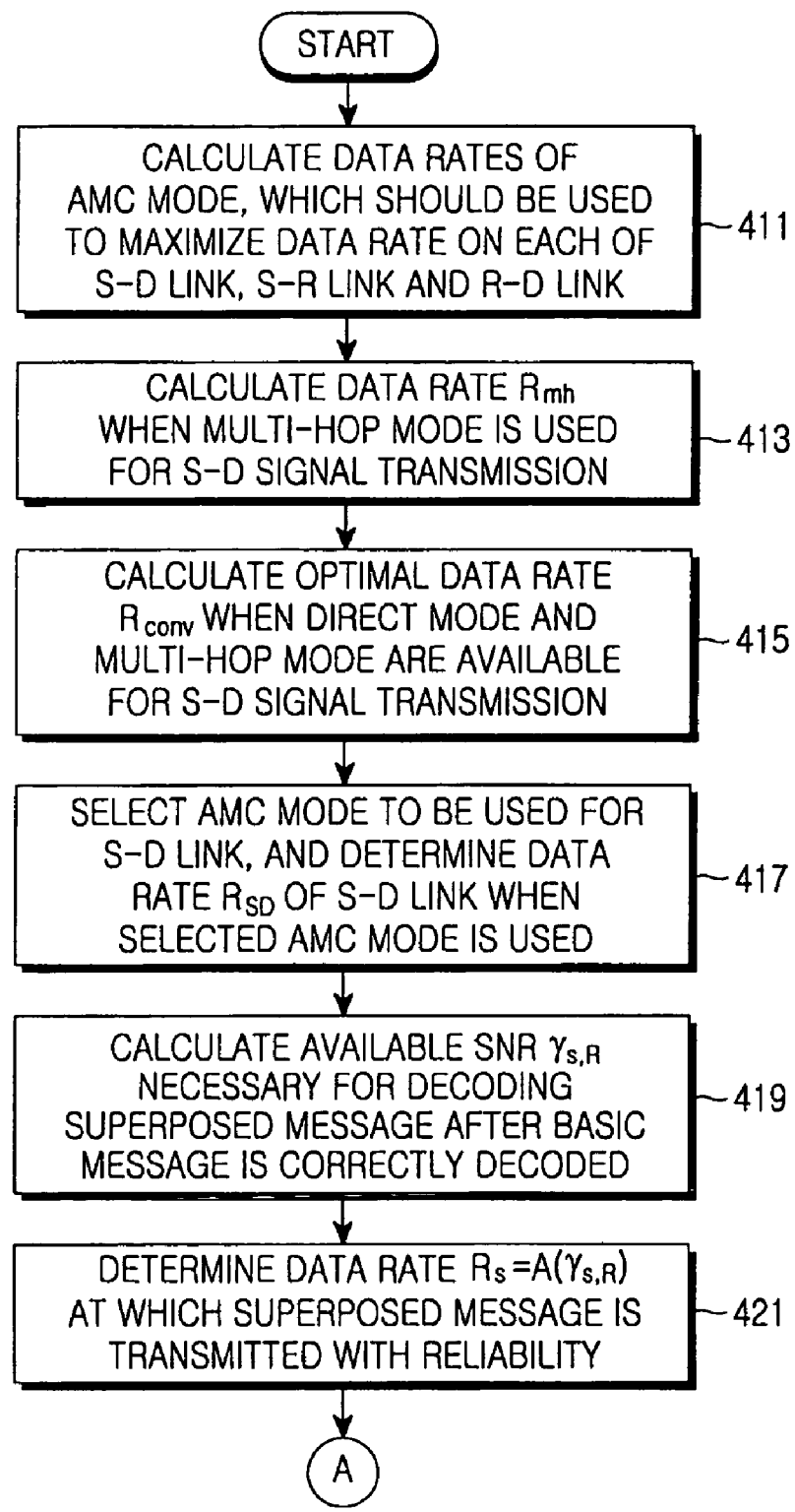
FIGS. 4A and 4B are flowcharts illustrating a signal relay process performed by a source node S in a communication system according to an embodiment of the present invention.
Figure 4B:
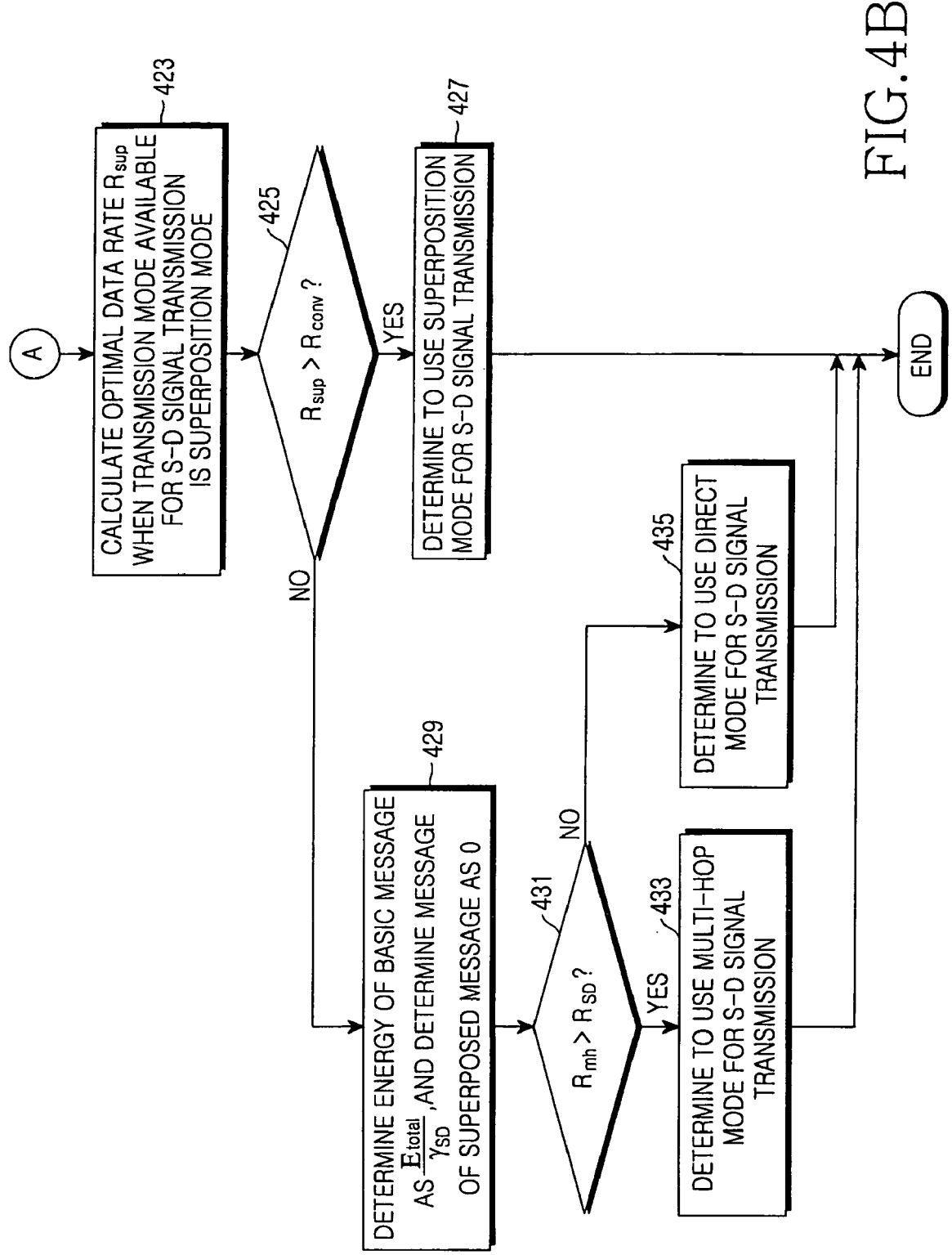

With reference to FIGS. 4A and 4B, a description will now be made of a signal relay process in a communication system according to an embodiment of the present invention.

FIGS. 4A and 4B are flowcharts illustrating a signal relay process performed by a source node S in a communication system according to an embodiment of the present invention.

Referring to FIGS. 4A and 4B, in step 411, the source node S calculates data rates of an AMC mode, which should be used to maximize a data rate on each of the links between the source node S and a destination node D, between the source node S and a relay node R, and between the relay node R and the destination node D. Herein, assuming that an SNR between the source node S and the destination node D is denoted by $\gamma_{SD}$, an SNR between the source node S and the relay node R is denoted by $\gamma_{SR}$, and an SNR between the relay node R and the destination node D is denoted by $\gamma_{RD}$, the data rates of the AMC mode, which should be used to maximize a data rate on each of the links between the source node S and the destination node D, between the source node S and the relay node R, and between the relay node R and the destination node D are given by Equation (13).

In step 413, the source node S calculates a data rate $R_{mh}$ for the case where it uses a multi-hop mode for signal transmission between the source node S and the destination node D. The data rate $R_{mh}$ is calculated using Equation (14). In step 415, the source node S calculates an optimal data rate $R_{conv}$ for the case where transmission modes available for signal transmission between the source node S and the destination node D include the direct mode and the multi-hop mode. The optimal data rate $R_{conv}$ is calculated using Equation (15).

In step 417, the source node S selects an AMC mode to be used for the link between the source node S and the destination node D, and determines a data rate $R_{SD}$ for the link between the source node S and the destination node D when the selected AMC mode is used. If it is assumed that the source node S selects a $b^{th}$ AMC mode as the AMC mode to be used for the link between the source node S and the destination node D, the data rate $R_{SD}$ is $R_b$ ($R_{SD}=R_b$). In step 419, the source node S calculates an available SNR $\gamma_{s,R}$ necessary for decoding a superposed message, after a basic message is correctly decoded. The available SNR $\gamma_{s,R}$ is calculated using Equation (21).

In step 421, the source node S determines a data rate $R_s=A(\gamma_{s,R})$ at which the superposed message is transmitted with reliability. In step 423, the source node S calculates an optimal data rate $R_{sup}$ for the case where a transmission mode available for signal transmission between the source node S and the destination node D is the superposition mode. The optimal data rate $R_{sup}$ is calculated using Equation (22). In step 425, the source node S determines whether the optimal data rate $R_{sup}$ exceeds the optimal data rate $R_{conv}$. If the optimal data rate $R_{sup}$ exceeds the optimal data rate $R_{conv}$, the source node S proceeds to step 427 where it determines to use the superposition mode for the signal transmission from the source node S to the destination node D, and then ends the signal relay process. The energy of the basic message and the superposed message for the case where the superposition mode is used for the signal transmission from the source node S to the destination node D is determined using Equation (24).

However, if it is determined in step 425 that the optimal data rate $R_{sup}$ does not exceed the optimal data rate $R_{conv}$, the source node S proceeds to step 429 where it sets energy of the basic message to $$\frac{E_{total}}{\gamma_{SD}}$$

and sets energy of the superposed message to '0'. In step 431, the source node S determines whether the data rate $R_{mh}$ exceeds the data rate $R_{SD}$. If the data rate $R_{mh}$ exceeds the data rate $R_{SD}$, the source node S proceeds to step 433 where it determines to use the multi-hop mode for the signal transmission from the source node S to the destination node D, and then ends the signal relay process. However, if it is determined in step 431 that the data rate $R_{mh}$ does not exceed the data rate $R_{SD}$, the source node S proceeds to step 435 where it determines to use the direct mode for the signal transmission from the source node S to the destination node D, and then ends the signal relay process.

As can be understood from the foregoing description, the present invention determines the transmission mode used for signal transmission from the source node to the destination node in the form of increasing the throughput, i.e., in the form of increasing the data rate in the communication system, thereby contributing to an increase in the total efficiency of the communication system.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for relaying a signal in a source node of a communication system, the method comprising the steps of:
calculating a data rate of an Adaptive Modulation and Coding (AMC) mode, which is used to maximize a data rate on each of a first link between the source node and a destination node, a second link between the source node and a relay node, and a third link between the relay node and the destination node;
calculating a first data rate for the case where a multi-hop mode is used for signal transmission between the source node and the destination node;
calculating a first optimal data rate for the case where transmission modes available for signal transmission between the source node and the destination node include a direct mode and the multi-hop mode;
selecting an AMC mode to be used for the first link and determining a second data rate for the first link when the selected AMC mode is used;
calculating an available signal-to-noise ratio (SNR) needed to decode a superposed message after a basic message is decoded, when a signal transmitted from the source node to the destination node includes the basic message and the superposed message;
determining a third data rate at which the superposed message is transmitted with reliability;
calculating a second optimal data rate for the case where a transmission mode available for signal transmission between the source node and the destination node is the superposition mode;
determining whether the second optimal data rate exceeds the first optimal data rate; and
determining to use the superposition mode for signal transmission from the source node to the destination node, if the second optimal data rate exceeds the first optimal data rate.

2. The method of claim 1, further comprising the steps of:
if the second optimal data rate does not exceed the first optimal data rate, determining energy of the basic message taking into account total energy and the SNR between the source node and the destination node, and determining energy of the superposed message as zero (0);
determining whether the first data rate exceeds the second data rate; and
determining to use the multi-hop mode for signal transmission from the source node to the destination node if the first data rate exceeds the second data rate.

3. The method of claim 2, further comprising the step of determining to use the direct mode for the signal transmission from the source node to the destination node if the first data rate does not exceed the second data rate.

4. The method of claim 3, wherein when data rates of the AMC mode, each of which should be used for each of the first link, the second link, and the third link, are expressed as $$R_{SD}=A(\gamma_{SD}) R_{SR}=A(\gamma_{SR}) R_{RD}=A(\gamma_{RD}),$$

where $R_{SD}$ denotes a data rate of the AMC mode which is used for the first link, $R_{SR}$ denotes a data rate of the MAC mode which is used for the second link, $R_{RD}$ denotes a data rate of the AMC mode which is used for the third link, $A(\gamma_{SD})$ denotes an SNR of the first link, $A(\gamma_{SR})$ denotes an SNR of the second link, and $A(\gamma_{RD})$ denotes an SNR of the third link, the step of calculating a first data rate comprises the step of calculating the first data rate using the following equation, $$R_{mh} = \frac{N}{T + \frac{R_{SR}}{R_{RD}}T} = \frac{R_{SR}R_{RD}}{R_{SR}+R_{RD}}$$

where $R_{mh}$ denotes the first data rate, N denotes a signal size, and T denotes a time $$T = \frac{N}{R_{SR}}$$

required for transmitting a signal with the size N from the source node to the relay node at a data rate $R_{SR}$.

5. The method of claim 4, wherein the step of calculating a first optimal data rate comprises the step of calculating the first optimal data rate using the following equation, $$R_{conv}=\max\{R_{SD},R_{mh}\}$$

where $R_{conv}$ denotes the first optimal data rate.

6. The method of claim 5, wherein when the AMC mode determined to be used for the first link is a $b^{th}$ AMC mode and the second data rate is denoted by $R_b$, the step of calculating an available SNR comprises the step of calculating the available SNR using the following equation, $$\gamma_{s,R} = \frac{|h_{SR}|^2 E_2}{\sigma^2} = \frac{|h_{SR}|^2}{|h_{SD}|^2} \frac{\left(\sqrt{2\gamma_{SD}-\tau_b} - \sqrt{\tau_b}\right)^2}{4}$$

where $\gamma_{s,R}$ denotes the available SNR, $h_{SD}$ denotes a channel gain of the first link, $h_{SR}$ denotes a channel gain of the second link, wherein $|h_{SR}|>|h_{SD}|$, $E_2$ denotes energy of the superposed message, $\sigma^2$ denotes a variance of a complex noise signal, and $\tau_b$ denotes an SNR threshold when the $b^{th}$ AMC mode is used.

7. The method of claim 6, wherein when the third data rate is expressed as $$R_s=A(\gamma_{s,R})$$

where $R_s$ denotes the third data rate,
the step of calculating a second optimal data rate comprises the step of calculating the second optimal data rate using the following equation, $$R_{sup} = \frac{N_b+N_s}{T+\frac{N_s}{R_{RD}}} = \frac{R_{RD}(R_b+R_s)}{R_{RD}+R_s}$$

where $R_{sup}$ denotes the second optimal data rate, $N_b$ denotes a size of the basic message, and $N_s$ denotes a size of the superposed message.

8. The method of claim 7, further comprising the step of determining energy of the basic message and energy of the superposed message using the following equation, after determining to use the superposition mode for the signal transmission from the source node to the destination node, $$\frac{|h_{SD}|^2}{\sigma^2} = \frac{\gamma_{SD}}{E_{total}}$$

$$E_1 = \frac{E_{total}}{\gamma_{SD}} \frac{\left(\sqrt{2\gamma_{SD} - \tau_b} + \sqrt{\tau_b}\right)^2}{4}$$

$$E_2 = \frac{E_{total}}{\gamma_{SD}} \frac{\left(\sqrt{2\gamma_{SD} - \tau_b} - \sqrt{\tau_b}\right)^2}{4}$$

where $E_{total}$ denotes the total energy, and $E_1$ denotes the energy of the basic message.

9. The method of claim 4, wherein the step of determining energy of the basic message taking into account the total energy and the SNR between the source node and the destination node comprises the step of determining the energy of the basic message by dividing the total energy by the SNR of the first link.

10. A system for relaying a signal in a communication system, comprising:
a source node;
a destination node; and
a relay node;
wherein the source node comprises:
calculating a data rate of an Adaptive Modulation and Coding (AMC) mode, which is used to maximize a data rate on each of a first link between the source node and the destination node, a second link between the source node and the relay node, and a third link between the relay node and the destination node;
calculating a first data rate for the case where a multi-hop mode is used for signal transmission between the source node and the destination node;
calculating a first optimal data rate for the case where transmission modes available for signal transmission between the source node and the destination node include a direct mode and the multi-hop mode;
selecting an AMC mode to be used for the first link and determining a second data rate for the first link when the selected AMC mode is used;
calculating an available signal-to-noise ratio (SNR) needed to decode a superposed message after a basic message is decoded, when a signal transmitted from the source node to the destination node includes the basic message and the superposed message;
determining a third data rate at which the superposed message is transmitted with reliability;
calculating a second optimal data rate for the case where a transmission mode available for signal transmission between the source node and the destination node is the superposition mode;
determining whether the second optimal data rate exceeds the first optimal data rate; and
determining to use the superposition mode for signal transmission from the source node to the destination node, if the second optimal data rate exceeds the first optimal data rate.

11. The system of claim 10, wherein the source node comprises:
if the second optimal data rate does not exceed the first optimal data rate, determining energy of the basic message taking into account the total energy and the SNR between the source node and the destination node, and determining energy of the superposed message as zero (0);
determining whether the first data rate exceeds the second data rate; and
determining to use the multi-hop mode for signal transmission from the source node to the destination node if the first data rate exceeds the second data rate.

12. The system of claim 11, wherein the source node determines to use the direct mode for the signal transmission from the source node to the destination node if the first data rate does not exceed the second data rate.

13. The system of claim 12, wherein when data rates of the AMC mode, each of which is used for each of the first link, the second link, and the third link, are expressed as $$R_{SD} = A(\gamma_{SD}) R_{SR} = A(\gamma_{SR}) R_{RD} = A(\gamma_{RD}),$$

where $R_{SD}$ denotes a data rate of the AMC mode which is used for the first link, $R_{SR}$ denotes a data rate of the MAC mode which is used for the second link, $R_{RD}$ denotes a data rate of the AMC mode which is used for the third link, $A(\gamma_{SD})$ denotes an SNR of the first link, $A(\gamma_{SR})$ denotes an SNR of the second link, and $A(\gamma_{RD})$ denotes an SNR of the third link,
the source node calculates the first data rate using the following equation, $$R_{mh} = \frac{N}{T + \frac{R_{SR}}{R_{RD}} T} = \frac{R_{SR} R_{RD}}{R_{SR} + R_{RD}}$$

where $R_{mh}$ denotes the first data rate, N denotes a signal size, and T denotes a time $$T = \frac{N}{R_{SR}}$$

required for transmitting a signal with the size N from the source node to the relay node at a data rate $R_{SR}$.

14. The system of claim 13, wherein the source node calculates the first optimal data rate using the following equation, $$R_{conv} = \max\{R_{SD}, R_{mh}\}$$

where $R_{conv}$ denotes the first optimal data rate.

15. The system of claim 14, wherein when the AMC mode determined to be used for the first link is a $b^{th}$ AMC mode and the second data rate is denoted by $R_b$, the source node calculates the available SNR using the following equation, $$\gamma_{s,R} = \frac{|h_{SR}|^2 E_2}{\sigma^2} = \frac{|h_{SR}|^2}{|h_{SD}|^2} \frac{\left(\sqrt{2\gamma_{SD} - \tau_b} - \sqrt{\tau_b}\right)^2}{4}$$

where $\gamma_{s,R}$ denotes the available SNR, $h_{SD}$ denotes a channel gain of the first link, $h_{SR}$ denotes a channel gain of the second link, wherein $|h_{SR}| > |h_{SD}|$, $E_2$ denotes energy of the superposed message, $\sigma^2$ denotes a variance of a complex noise signal, and $\tau_b$ denotes an SNR threshold when the $b^{th}$ AMC mode is used.

16. The system of claim 15, wherein when the third data rate is expressed as $$R_s = A(\gamma_{s,R})$$

where $R_s$ denotes the third data rate,
the source node calculates the second optimal data rate using the following equation, $$R_{sup} = \frac{N_b + N_s}{T + \frac{N_s}{R_{RD}}} = \frac{R_{RD}(R_b + R_s)}{R_{RD} + R_s}$$

where $R_{sup}$ denotes the second optimal data rate, $N_b$ denotes a size of the basic message, and $N_s$ denotes a size of the superposed message.

17. The system of claim 16, wherein the source node determines energy of the basic message and energy of the superposed message using the following equation, after determining to use the superposition mode for the signal transmission from the source node to the destination node, $$\frac{|h_{SD}|^2}{\sigma^2} = \frac{\gamma_{SD}}{E_{total}}$$

-continued $$E_1 = \frac{E_{total}}{\gamma_{SD}} \frac{\left(\sqrt{2\gamma_{SD} - \tau_b} + \sqrt{\tau_b}\right)^2}{4}$$

$$E_2 = \frac{E_{total}}{\gamma_{SD}} \frac{\left(\sqrt{2\gamma_{SD} - \tau_b} - \sqrt{\tau_b}\right)^2}{4}$$

where $E_{total}$ denotes the total energy, and $E_1$ denotes the energy of the basic message.

18. The system of claim 13, wherein the source node determines the energy of the basic message by dividing the total energy by the SNR of the first link.

\* \* \* \* \*

UNITED STATES PATENT AND TRADEMARK OFFICE
CERTIFICATE OF CORRECTION

| | | |
|---|---|---|
| PATENT NO. | : 7,586,846 B2 | Page 1 of 1 |
| APPLICATION NO. | : 11/388682 | |
| DATED | : September 8, 2009 | |
| INVENTOR(S) | : Popovski et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 818 days.

Signed and Sealed this

Twenty-first Day of September, 2010

David J. Kappos
*Director of the United States Patent and Trademark Office*